United States Patent [19]
Utsunomiya et al.

[11] 4,344,089
[45] Aug. 10, 1982

[54] GHOST CANCELLING SYSTEM

[75] Inventors: Kimitake Utsunomiya, Sagamihara; Hisafumi Yamada, Tohshin; Choei Kuriki, Urawa, all of Japan

[73] Assignee: Sony Corporation, Tokyo, Japan

[21] Appl. No.: 222,687

[22] Filed: Jan. 5, 1981

[30] Foreign Application Priority Data

Jan. 12, 1980 [JP] Japan .................................. 55/2296

[51] Int. Cl.³ ............................................. H04N 5/21
[52] U.S. Cl. .................................... 358/167; 358/166; 358/905
[58] Field of Search ....................... 358/167, 166, 905

[56] References Cited
U.S. PATENT DOCUMENTS 4,044,381 8/1977 Shimano et al. .................... 358/905
4,127,874 11/1978 Iwasawa et al. .................... 358/905

Primary Examiner—Richard Murray
Attorney, Agent, or Firm—Hill, Van Santen, Steadman, Chiara & Simpson

[57] ABSTRACT

A ghost cancelling system for eliminating a ghost by using a ghost cancelling signal formed from an input video signal including the ghost and adding the ghost cancelling signal to the input video signal. In this ghost cancelling system, the divergence of the ghost cancelling circuit is avoided during the transient time of the channel selection or during the ghost cancelling process, and when there is the possibility that the ghost cancelling circuit diverges, the circuit is firstly made operable as a feed-forward type circuit for a predetermined period and thereafter made operable as a feedback type circuit.

8 Claims, 10 Drawing Figures

FIG. 1
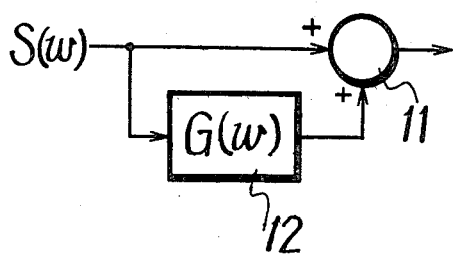
FIG. 2A (PRIOR ART)
FIG. 2B (PRIOR ART)
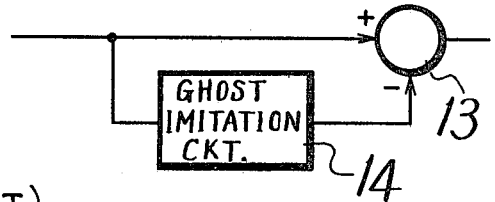
FIG. 3 (PRIOR ART)
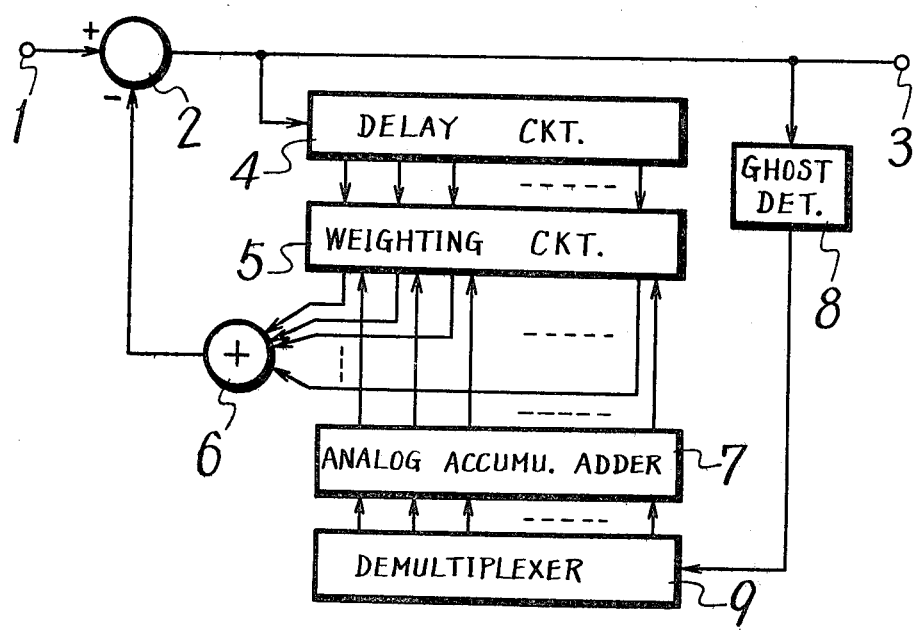
FIG. 4
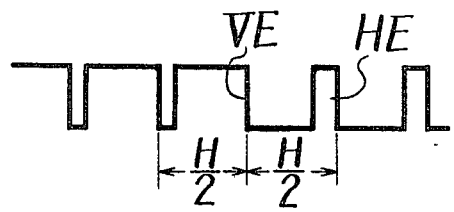
FIG. 5A
FIG. 5B
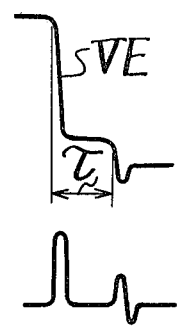

GHOST CANCELLING SYSTEM

BACKGROUND OF THE INVENTION

Field of the Invention

The present invention relates mainly to a ghost cancelling system, and particularly to such a system in which a divergence of a ghost cancelling circuit is avoided during the transient time for the channel selection so that the ghost signal can be reliably eliminated.

A video signal transmission path including a ghost originating source is expressed by a simple block diagram as shown in FIG. 1. In FIG. 1, an original video signal S(w) is supplied to an adder 11, and also the video signal S(w) is supplied through a ghost originating source 12 with a transmission function expressed by G(w) to the adder 11. Accordingly, from the adder 11 is delivered a video signal such as $$S(w)(1+G(w))$$

which includes a ghost signal component shown by S(w)G(w).

In order to eliminate such a ghost signal component, an imitation circuit for imitating the transmission function of the ghost originating source 12 is provided and an input video signal including ghost is used to form a ghost imitating signal used as a ghost cancelling signal. Then, the ghost cancelling signal is subtractively added to the input video signal so that the ghost is eliminated. For such a ghost cancelling circuit, there are known two types of circuits such as shown in FIGS. 2A and 2B.

FIG. 2A shows a ghost cancelling circuit known as a feedback type one. In FIG. 2A, a video signal including ghost is passed through a subtraction type adder 13, while the output signal of the adder 13 is supplied to a ghost imitation circuit 14 to form a ghost cancelling signal which is then fed back to the adder 13 for being subtracted from the input video signal.

FIG. 2B shows a ghost cancelling circuit known as a feed-forward type one. In FIG. 2B, an input video signal including ghost is supplied to the subtraction type adder 13, while the input video signal is supplied to the ghost imitation circuit 14 to form a ghost cancelling signal which is fed forwardly to the adder 13 for being subtracted from the input video signal.

In the ghost cancelling circuit shown in FIG. 2B, it is known that a secondary ghost is generally produced in the ghost cancelling process. As a result, in the prior art ghost cancelling system, the feedback type ghost cancelling circuit as shown in FIG. 2A has been more often adopted. FIG. 3 shows an embodiment of such a known feedback type ghost cancelling system.

In the ghost cancelling system shown in FIG. 3, a video signal including ghost, which is detected by a synchronous detector (not shown), is supplied through an input terminal 1 to an adder 2. To the adder 2 is also supplied a ghost imitation signal as a ghost cancelling signal from a transversal filter which will be described later. Then a ghost cancelled-out video signal appears at an output terminal 3. The video signal obtained at the output side of the adder 2 is fed to a delay circuit 4. The delay circuit 4 is composed of a plurality of stages (e.g., 15 stages) of delay units each having a delay time corresponding to a signal sampling period (e.g., 100 nanoseconds[ns]) with n taps being led out from respective stages. The outputs from the n taps of the delay circuit 4 are supplied to a multiplier type weighting circuit 5 so that weighting functions are multiplied thereto respectively. All of the outputs therefrom are supplied to an adder 6 to generate a ghost cancelling signal therein.

Weighting functions for the weighting circuit 5 are generated in an analog accumulative adder 7. The detection of a ghost component is achieved by supplying the output signal of the adder 2 to a ghost detector circuit 8. As a ghost level detecting period, a period which is included in the standard television signal and not affected by the video signal as long as possible is selected. A vertical synchronizing signal period is generally selected as such a ghost detecting period. In general, as shown in FIG. 4, the period of H/2 from the front edge VE of a vertical synchronizing signal to an equalizing pulse HE is selected as the detecting period as well known in the prior art. The signal level during the detecting period is differentiated and weighting functions are formed therefrom, and the tapped outputs of the delay line are weighted in proportion to the differentiated level. For example, at the high frequency stage, when a ghost having a delay time $\tau$ and a phase difference $\zeta$ ($\zeta = w_c \tau$ where $w_c$ is an angular frequency of the video carrier signal at the high frequency stage) is included supposing that the phase difference $\zeta$ is around 45°, a video signal having a waveform as shown in FIG. 5A is obtained during the ghost detecting period. This signal is differentiated and inverted in its polarity, so that a differentiated waveform as shown in FIG. 5B is obtained. Since this differentiated waveform can be approximately regarded as the impulse response of the ghost signal, the weighting functions are formed in proportion to the level of this differentiated signal. Accordingly, the differentiated waveform of a video signal during the ghost detecting period is obtained from the ghost detecting circuit 8 and this differentiated signal is supplied to a demultiplexer 9 successively. The demultiplexer 9 is similar to the delay circuit 4 and composed of a plurality of stages of delay units each having a delay time corresponding to the signal sampling period with n taps being led out from respective stages. The outputs of the n taps therefrom are fed to the analog accumulative adder 7 respectively.

The delay circuit 4, weighting circuit 5 and adder 6 are combined to form a transversal filter, and this transversal filter is inserted into the feedback loop to form a so-called inverse filter so that the ghost component in the input video signal can be eliminated. In this case, a distortion of the waveform during a period of ½H after the front edge of a vertical synchronizing signal is detected to determine the weighting functions. Thereafter, if the ghost component still remains uncancelled in the output video signal, the remaining ghost component is detected again in the detector 8 and the analog accumulative adder 7 operates to decrease the remaining ghost component.

However, in such a feedback type ghost cancelling system, there is the possibility that the ghost cancelling operation of the ghost cancelling circuit may diverge in the ghost cancelling process during the transient time of the channel selection. In more detail when a received channel is changed over from one to another, it happens that values corresponding to the weighting functions relating to the preceding channel remain in the analog accumulative adder 7 and the remaining weighting functions are meaningless at all with respect to a newly received channel having the different angular frequency $w_c$ of the video carrier. Therefore, during the transient time when a new channel is selected, the adder 2 delivers a video signal including a false ghost component different from the original or real ghost component. Such a false ghost is different in tendency from the real ghost, and therefore it is apprehended that the ghost cancelling circuit may diverge in the ghost cancelling process.

To prevent such a divergence, it can be proposed that during the channel selection, the weighting functions held or memorized in the analog accumulative adder 7 are cleared or reset to a reference DC value. However, in order to provide such a reset circuit, it is required to provide resetting means at the respective n taps of the weighting circuit 5 with the result that the whole circuit becomes quite complicated.

In the description above the divergence of the circuit is taken as a problem during the channel selection, but such a problem also arises when a continuous noise of a so-called ignition noise and so on is detected, because such a noise is detected as a false ghost which is different from the actual ghost, so that there is the possibility that the incorrect and meaningless weighting may cause the divergence of the ghost cancelling circuit.

SUMMARY OF THE INVENTION

Accordingly, it is an object of this invention to provide a ghost cancelling system for preventing the ghost cancelling circuit from diverging with a simple construction.

It is another object of this invention to provide a ghost cancelling system by which a ghost signal can be reliably eliminated.

According to one aspect of this invention, a ghost cancelling system is provided, in which an input video signal including a ghost is used to form a ghost cancelling signal, and these input video signal and ghost cancelling signal are subtractively added together to eliminate the ghost. In this case, the divergence of the ghost cancelling circuit is avoided during the transient time of the channel selection or during the process of the ghost cancelling, and when there is the possibility that the ghost cancelling circuit diverges, the circuit is firstly made operable as a feed-forward type circuit for a predetermined period and made operable as a feedback type circuit after the above predetermined period.

Various further and more specific objects, features and advantages of the invention will appear from the description given below taken in connection with accompanying drawings illustrating preferred embodiments of this invention.

BRIEF DESCRIPTION OF THE DRAWINGS

FIG. 1 is a conceptional block diagram of a signal transmission path including a ghost originating source;

FIGS. 2A and 2B are simplified views respectively showing a feedback type and a feed-forward type ghost cancelling circuits known in the prior art;

FIG. 3 is a systematic block diagram showing an embodiment of a known feedback type ghost cancelling circuit;

FIG. 4 and FIGS. 5A and 5B are waveform diagrams respectively used for explaining the ghost cancelling circuit of FIG. 3;

DESCRIPTION OF THE PREFERRED EMBODIMENTS

A description will hereinafter be given on the embodiments of this invention with reference to the drawings.

Figure 6:
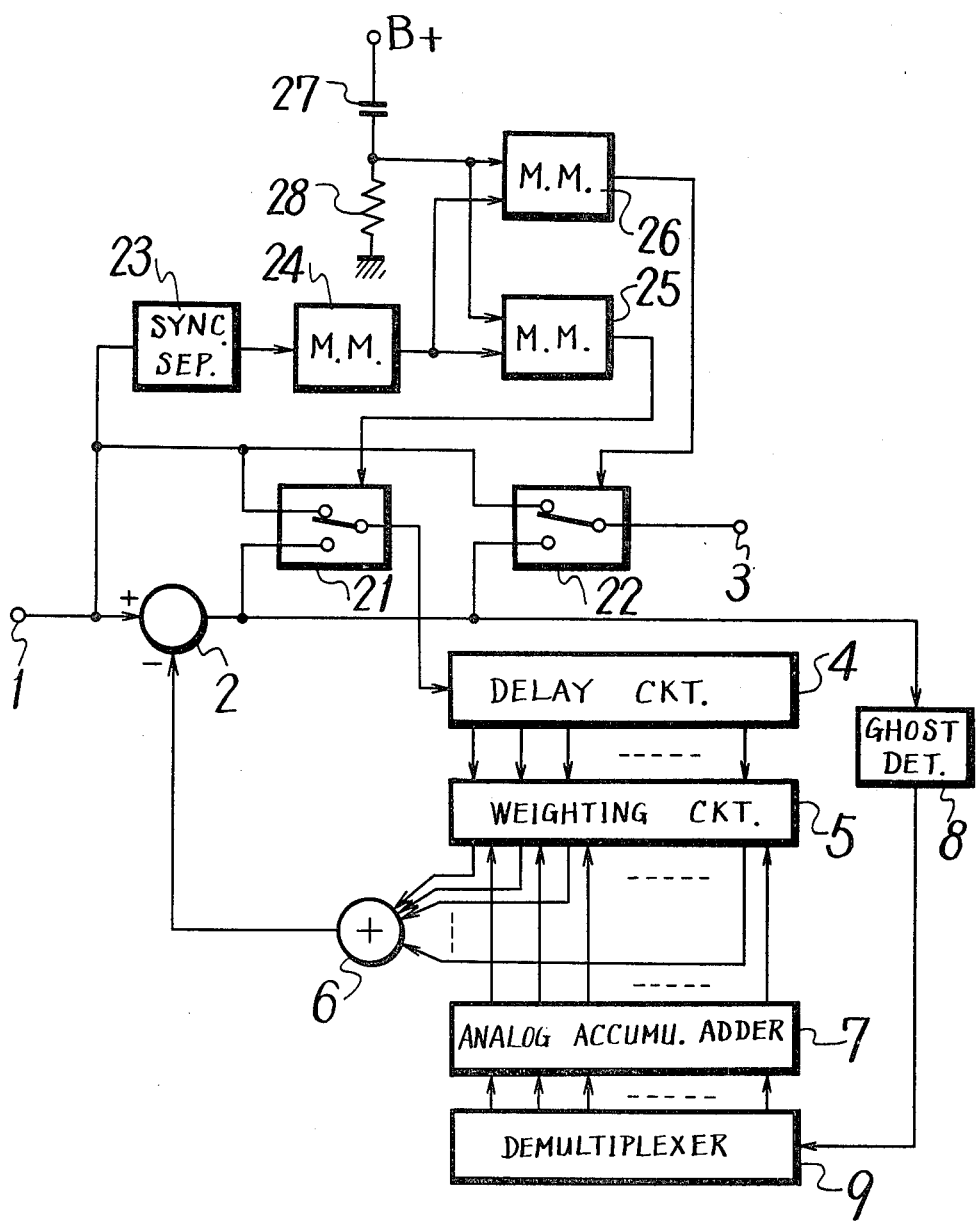
FIG. 6 is a circuit diagram showing one example of a ghost cancelling system according to this invention.

FIG. 6 shows one example of a ghost cancelling system according to this invention, in which elements corresponding to those of FIG. 3 are shown by like reference numerals with the description thereof being omitted. In FIG. 6, the video signal from the input terminal 1 and the output signal of the adder 2 are supplied to a switching circuit 21 and a signal selected by this switching circuit 21 and a signal selected by this switching circuit 21 is fed to the delay circuit 4. Similarly, the video signal from the input terminal 1 and the output signal of the adder 2 are supplied to a switching circuit 22 and a signal selected by this switching circuit 22 is obtained at the output terminal 3.

Further, the video signal from the input terminal 1 is supplied to a synchronizing signal separator circuit, or synch. separator circuit, 23 to separate a horizontal synchronizing signal. This horizontal synchronizing signal is then fed to a retriggerable monostable multivibrator 24 having a time constant which is longer than the length of one horizontal period (about 64 micro seconds), for example, 1 milisecond. An output of this multivibrator 24 is supplied to a monostable multivibrator 25 having a time constant which is an actual time corresponding to a time necessary for the feed-forward type ghost cancelling circuit to converge, for example, one second. An output of the multivibrator 25 is applied to a control terminal of the switching circuit 21 so that it is changed over to the side of input terminal 1 during the unstable state of the multivibrator 25.

Similarly, the output of the multivibrator 24 is supplied to a monostable multivibrator 26 having a time constant which is an actual time corresponding to a summed time of the time required for the feed-forward type ghost cancelling circuit to converge and a time required for correctly changing the weighting functions of the feed-forward type ghost cancelling circuit to the corresponding weighting functions of the feedback type ghost cancelling circuit, for example, a time constant corresponding to two seconds. An output of the multivibrator 26 is fed to a control terminal of the switching circuit 22 so that it is changed over to the side of input terminal 1 during the unstable state of the multivibrator 26.

A voltage of a power supply B+ is supplied to a differentiation circuit consisting of a capacitor 27 and a resistor 28 and a differentiated output thereof is fed to the monostable multivibrators 25 and 26, respectively.

An operation of the circuit of FIG. 6 will next be described. During the channel selection, a horizontal synchronizing signal lacks in the video signal from the input terminal 1, so that a trigger pulse will not appear in the output of the sync separator 23. Therefore, the output of the multivibrator 24 falls down and hence the multivibrators 25 and 26 are triggered to their unstable states. As a result, the video signal from the input terminal 1 is supplied through the switching circuit 21 directly to the delay circuit 4 and thus produced ghost cancelling signal is supplied from the adder 6 to the adder 2. In other words, the circuit of FIG. 6 takes the feed-forward type construction as described in FIG. 2B to perform the ghost cancellation.

Further, when the time required for the feed-forward type ghost cancelling circuit to converge is passed, the monostable multivibrator 25 returns to its stable state to change the state of the switching circuit 21, so that the output signal of the adder 2 will be supplied through the switching circuit 21 to the delay circuit 4. In this case, the circuit of FIG. 6 is changed over to the feedback type ghost cancelling circuit mentioned in FIG. 2A to correct the weighting functions.

When a time required for the newly switched feedback type ghost cancelling circuit to converge is passed, the monostable multivibrator 26 returns to its stable state to change the state of the switching circuit 22 so that the output signal of the adder 2 is obtained at the output terminal 3.

During the channel selection and so on, the circuit of FIG. 6 operates firstly as a feed-forward type ghost cancelling circuit for a predetermined period and afterwards as a feedback type ghost cancelling circuit. Therefore, during the preceding ghost cancelling process of the feed-forward type, the possibility of the divergence of the circuit is completely avoided, and when the succeeding ghost cancelling process of the feedback type begins, the ghost level is suppressed enough by the preceding process and hence there is substantially no possibility that the feedback type ghost cancelling circuit diverges during its ghost cancelling process. When the feedback type ghost cancelling circuit converges, the secondary ghost is avoided from occurring as explained in connection with FIG. 2A.

The ghost cancelling is carried out in such a manner and according to this invention, a circuit with no possibility of the divergence of the ghost cancelling operation can be formed with a quite simplified construction.

In the above mentioned circuit, when the power switch is turned on, the differentiation circuit consisting of capacitor 27 and resistor 28 is operated to invert the states of the miltivibrators 25 and 26 and hence the same ghost cancelling operation as mentioned above is carried out. In other words, when the power switch is turned on, the possibility that the ghost cancelling circuit diverges is also avoided.

In the above example, the channel selection time and a time when the power switch is turned on are detected. However, as will be described below, the levels of the weighting functions may be measured to detect the divergence of the ghost cancelling operation.

Figure 7:
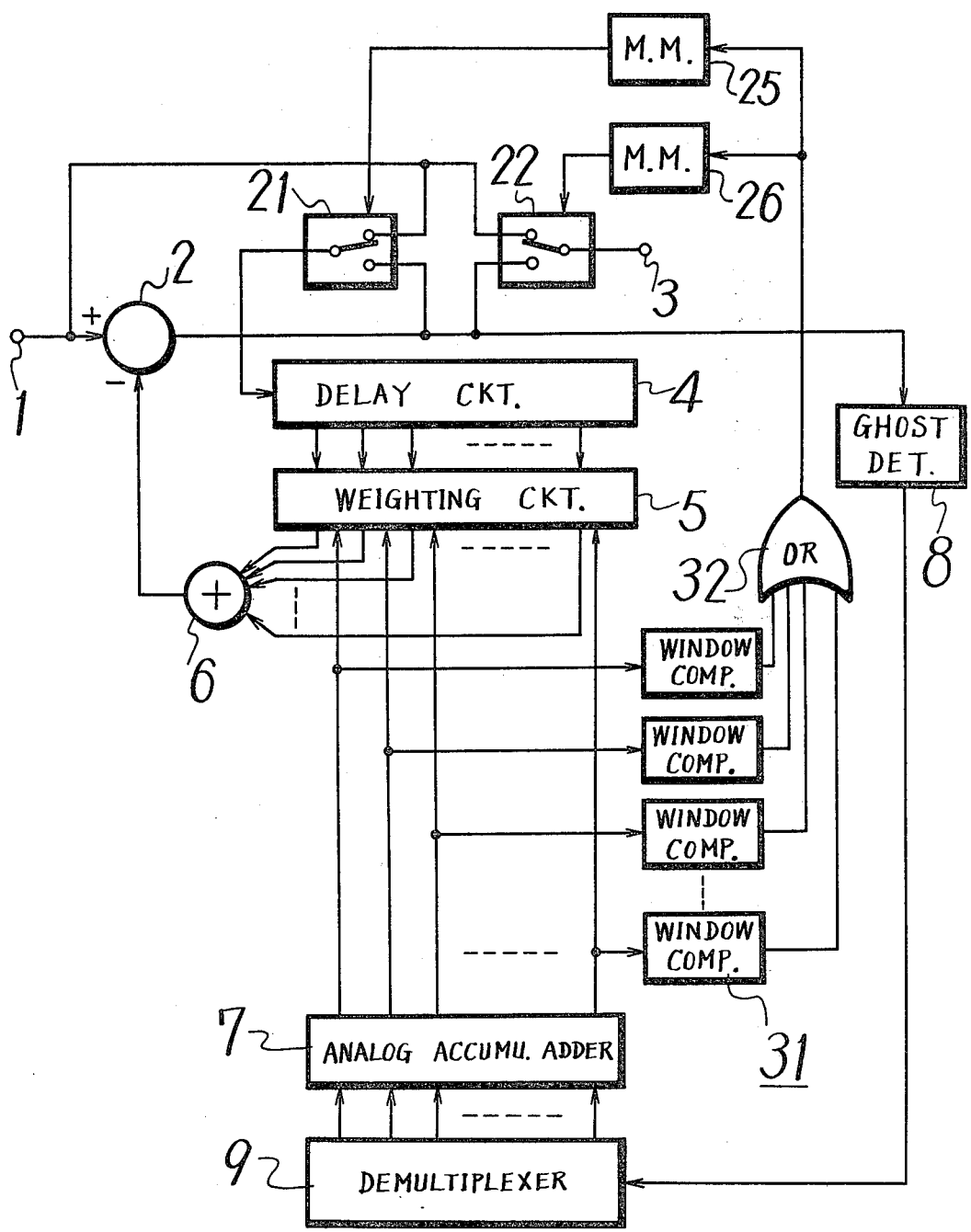
FIGS. 7 and 8 are circuit diagrams each showing another example of the ghost cancelling system according to this invention.

FIG. 7 shows another example of this invention, in which elements corresponding to those of FIG. 6 are illustrated by the same reference numerals with their detailed description being omitted. In FIG. 7, respective outputs of the analog accumulative adder 7 are supplied to respective window comparators 31 to detect the levels of weighting functions whether they are out of the predetermined ranges or not, and the detected outputs thereof are supplied through an OR circuit 32 to the monostable multivibrators 25 and 26. Other circuits are the same as FIG. 6.

Accordingly, in this circuit, when a continuous noise of a so-called ignition noise and so on causes the incorrect and meaningless weighting and the ghost cancelling operation goes to the direction of divergence, some levels of the weighting functions go beyond the predetermined ranges and the monostable multivibrators 25 and 26 are triggered through the OR circuit 32, so that a feed-forward type ghost cancelling circuit is formed to avoid the divergence of the circuit. According to the circuit of FIG. 7, during the channel selection and during the switching operation of the power switch, if the ghost cancelling operation goes to the direction of divergence, a feed-forward type circuit is formed.

Figure 8:
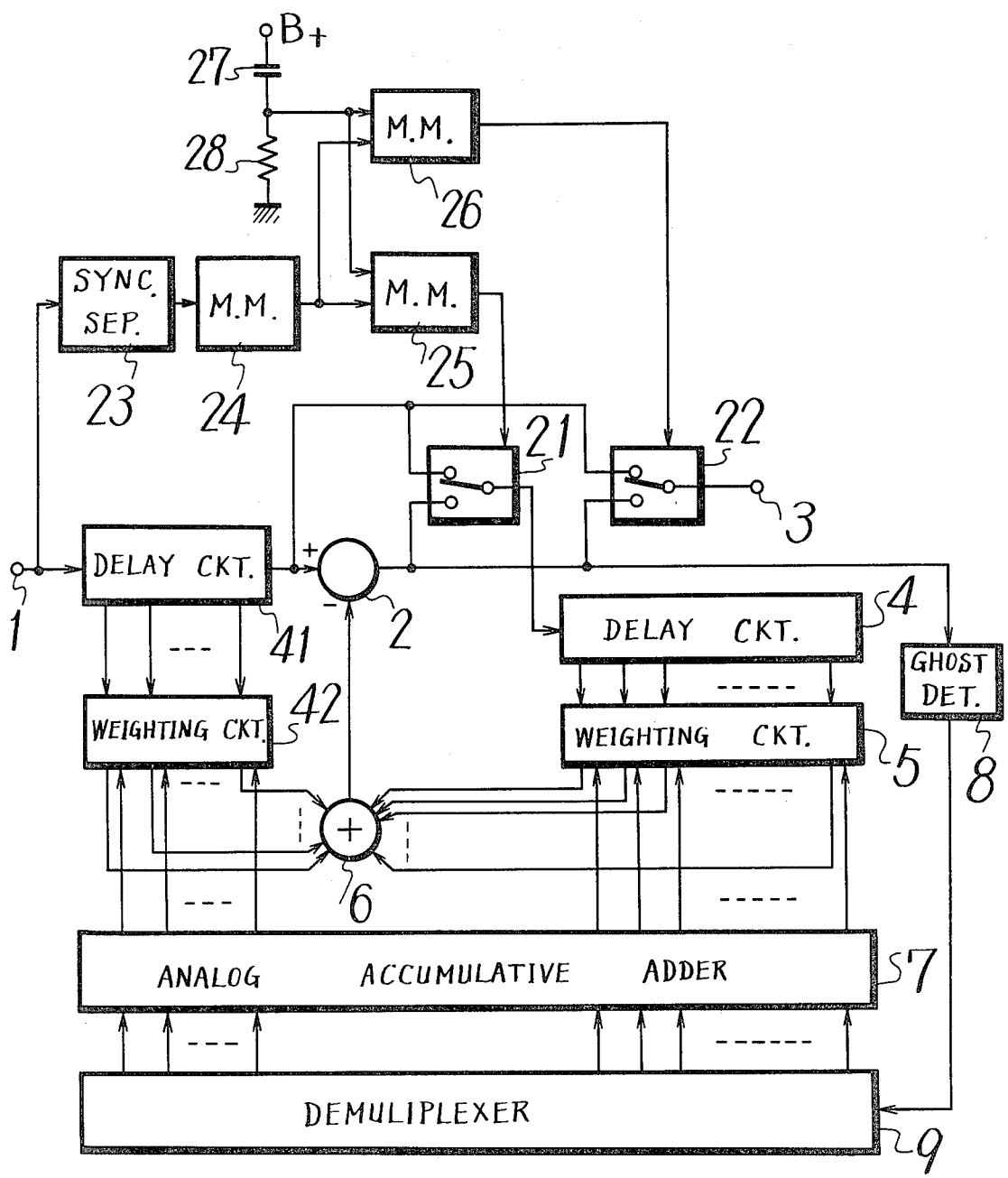

FIG. 8 shows a further example of this invention for use in a ghost cancelling system including a circuit for cancelling a so-called preceding ghost. In FIG. 8, the video signal from the input terminal 1 is supplied through a delay circuit 41 to the adder 2 while tapped outputs of the delay circuit 41 are supplied through weighting circuit 42 to the adder 6. The weighting circuit 42 is controlled by the signals from the analog accumulative adder 7. Other circuits are constructed in the same manner as in FIG. 6.

In this circuit, the preceding ghost cancelling circuit including the circuits 41 and 42 is added and this preceding ghost cancelling circuit is well known in the prior art and formed as a feed-forward type, so that the cancelling operation thereof is performed without divergence. Accordingly, it is also clear that the whole ghost cancelling system shown in FIG. 8 has no possibility of divergence.

While the principles of the invention have been described above in connection with specific embodiments, and particular modifications thereof, it is to be clearly understood that this description is made only by way of example and not as a limitation on the scope of the invention.

We claim as our invention:

1. A ghost cancelling system comprising:
   an input terminal applied with a video signal including a ghost signal component;
   a ghost cancelling circuit connected to said input terminal;
   an output terminal connected to said ghost cancelling circuit for deriving an output video signal in which said ghost signal component is substantially suppressed; and
   switching means included in said ghost cancelling circuit for making said ghost cancelling circuit operable between a feed-forward type circuit and a feedback type circuit.

2. A ghost cancelling system according to claim 1, wherein said switching means comprises detecting means for detecting the operation of a channel selection and activating means connected to said detecting means for making said ghost cancelling circuit operable as a feed-forward type circuit for a predetermined period and for making said ghost cancelling circuit operable as a feedback type circuit after said predetermined period.

3. A ghost cancelling system according to claim 2, wherein said switching means further comprises power responsive means for detecting the time when a power switch is turned on and another activating means connected to said power responsive means for making said ghost cancelling circuit operable as a feed-forward type circuit for another predetermined period and for making said ghost cancelling circuit operable as a feedback type circuit after said another predetermined period.

4. A ghost cancelling system according to claim 2, wherein said detecting means comprises a sync. separator connected to said input terminal and a monostable multivibrator connected to said sync. separator for generating a pulse signal having a duration corresponding to said predetermined period.

5. A ghost cancelling system according to claim 3, wherein said power responsive means comprises a differentiation circuit connected to a power supply line.

6. A ghost cancelling system according to claim 1, wherein said switching means comprises divergence detecting means connected to said ghost cancelling circuit and actuated when said ghost cancelling circuit begins to diverge, and activating means connected to said divergence detecting means for making said ghost cancelling circuit operable as a feed-forward type circuit for a predetermined period and for making said ghost cancelling circuit operable as a feedback type circuit after said predetermined period.

7. A ghost cancelling system according to claim 1, wherein said switching means comprises a switching circuit connected between said input and output terminals for directly connecting said input and output terminals when said ghost cancelling circuit operates as a feedback type circuit.

8. A ghost cancelling system according to claim 1, wherein said ghost cancelling circuit comprises
- a first adder connected to said input terminal;
- a ghost detector connected to said adder;
- a delay circuit;
- a weighting circuit connected between said ghost detector and said delay circuit; and
- a second adder connected between said first adder and said weighting circuit, said switching means selectively connecting said input terminal and an output of said first adder to said delay circuit for making said ghost cancelling circuit operable as a feed-forward type circuit and as a feedback type circuit respectively.

* * * * *